Sept. 18, 1951  A. O. FRANZ ET AL  2,568,279
LUMINESCENT TARGET
Filed Sept. 4, 1945
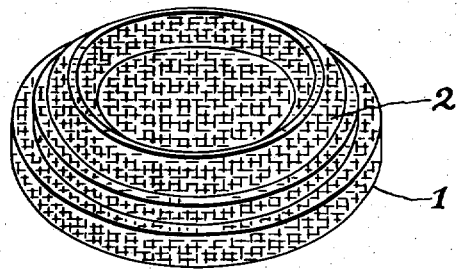
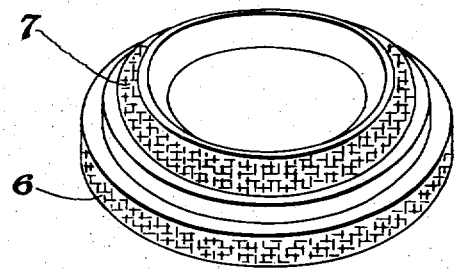
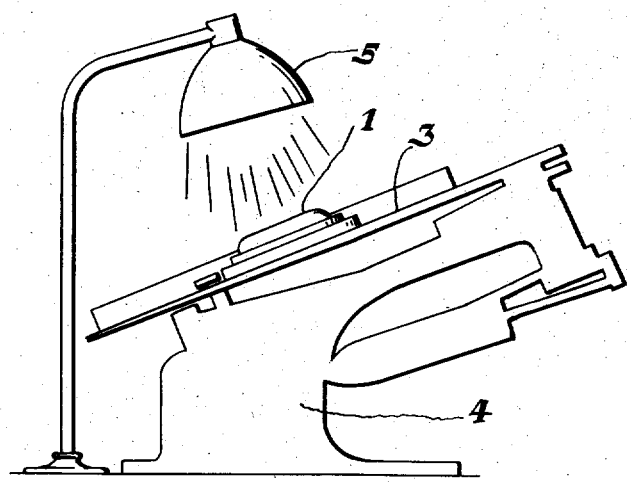
INVENTOR
Arvel O. Franz & Lewis Edmund Walkup
BY
ATTORNEYS Patented Sept. 18, 1951

2,568,279

UNITED STATES PATENT OFFICE 2,568,279

LUMINESCENT TARGET

Arvel O. Franz and Lewis Edmund Walkup, Alton, Ill., assignors to Olin Industries, Inc., East Alton, Ill., a corporation of Delaware Application September 4, 1945, Serial No. 614,180

8 Claims. (Cl. 250—71)

1

This invention relates to clay targets particularly adapted for night trap shooting.

Clay targets have long been in use in the sport of trap shooting. In general construction they are round clay bodies consisting of progressively smaller rings, the top ring being beveled inwardly and hollowed out on the upper face. The sport consists in projecting the circular clay body, or pigeon, suddenly into the vision field of a shooter and allowing him but a few seconds for an effective shot. The targets are projected in space by a trap. The sport has been confined, in the main, to the daytime, since some steady light source is a prerequisite for split-second aiming and firing and for equality of conditions during competitive shooting.

Night trap shooting has been attempted, the targets being thrown into an illuminated field, but this has not met with satisfaction for several reasons. Installations for this purpose are very expensive, requiring elaborate lighting systems in order to illuminate the entire shooting range, and hence such facilities are not within the economic reach of many devotees of the sport. Furthermore, and more important, even the most elaborate of such systems have fallen so short of approaching daylight shooting conditions that the idea of a completely illuminated range is in disfavor. The latter arises by reason of the low degree of contrast obtainable between the target and the background. Objects are seen against an illuminated background only by contrast. "Contrast" can be obtained only by having the object return more light or less light than, or differently colored light from, the background. Color contrast is impractical because at such low levels of illumination as it would be reasonable to achieve under the circumstances, man is almost completely color-blind. Visibility does not improve in direct proportion to increasing the intensity of the illuminated field and consequently, in order to achieve satisfactory target visibility (contrast) in an illuminated field, flood lighting on a scale comparable to illumination of baseball grounds for night play would be required. Such, of course, is beyond the bounds of reason in the premises.

The object of this invention, generally stated, is to provide a target for trap shooting which, when projected into darkness, will be readily visible to the shooter at the customary ranges.

Another object of the invention is to provide night trap shooting with satisfactory visibility on an economically feasible basis.

Other objects will become apparent when the

2 following description is read in connection with the accompanying drawings, in which:

Figure 1 is a perspective view of a clay target treated in accordance with the present invention;

Figure 2 is a perspective view of a clay target whose treatment, according to the present invention, is confined to limited areas; and Figure 3 is a diagrammatic view of a trap having a target thereon in the field of a light source.

In accordance with the present invention, an ordinary clay target of the type used in trap shooting is coated, in whole or in part, with a luminescent material, to wit, a material which, when exposed to radiant energy of short wave length such as ultraviolet light or "black light," or to visible light of considerable intensity, becomes phosphorescent. "Phosphorescence" is here used as connoting the property of emitting visible light for a limited time after being so activated. "Luminescence" is here used as connoting that property of materials which are capable of converting radiant energy of short wave lengths, such as ultraviolet light or "black light" of wave length of 3,200 to 4,000 angstrom units, to visible light.

The coating applied to the clay target in accordance with the present invention consists essentially of a luminescent pigment, such as zinc sulphide, 60%–40% zinc sulphide-zinc selenite, beta-2ZnO—SiO₂, calcium sulphide-strontium sulphide, or zinc sulphide-cadmium sulphide.

The present invention especially contemplates that the luminescent coating be activated immediately prior to the projection of the target into space and that the period of activation be so coordinated with the phosphorescent capacity of the coating that the target will be readily visible to the shooter throughout its trajectory, but it is not necessary that the visibility be prolonged.

Having provided the clay target with a coating of luminescent pigment, as aforesaid, the coating may be activated by passing it directly under a source of light such as a 150 watt incandescent lamp or an ultraviolet lamp. The activation is preferably accomplished immediately prior to projection of the clay target into space either after being placed in position upon the trap or just prior thereto. The period of exposure to the activating source depends, of course, upon the phosphorescent capacity of the coating, which, in turn, depends not only upon the composition of the coating, but upon the quantity thereof employed. In general, the period of exposure to the activating source must be sufficient to provide a target whose half life of light production is greater than one second and whose brilliance is above 100 microlamberts. The phosphorescence of such a target is sufficient for all normal trap shooting practices since, within one second after a target is projected from the trap, it will be approximately forty-five yards from the shooter or at about the limit of the effective range.

The present invention contemplates that the luminescent pigment be of such character and utilized in such quantities that an exposure to the activating source of not over four seconds is required to achieve the desired degree of phosphorescence. The limit of four seconds for activation is a practical one arrived at in consideration of the routine involved in the throwing of targets for trap shooting. Between the projection of successive targets in the ordinary practice of trap shooting, there is a hiatus sufficient to permit the target to rest upon the trap for a period of about four seconds. During this hiatus, the target may be activated before throwing by placing the target on the throwing arm of a trap located within the field of an activating source. Consequently, the present invention contemplates that within such period of time as is allowed between the projection of successive targets, the target may be activated to the desired extent. For the sake of clarity and in order to accurately define the particular limits of the capacity of a target treated in accordance with the present invention, to be activated and to retain its phosphorescence, that property is herein, and in the appended claims, expressed as a phosphorescence factor. As the expression "phosphorescence factor" is used herein, it will be understood to mean the ratio of the number of seconds which an activated target retains a brilliance of at least 100 microlamberts after activation, to the number of seconds of exposure under a 150 watt incandescent lamp (or equivalent ultraviolet lamp) at the distance of one foot. For example, a target which retains a brilliance of at least 100 microlamberts for one second after activation for a period of four seconds (under the conditions aforesaid) will have a phosphorescence factor of 0.25.

It will be understood, of course, that phosphorescence factors greatly in excess of 0.25 are anticipated as a practical matter. With any one of the luminescent pigments aforesaid applied in reasonable concentrations and exposed for a period of four seconds at a distance of one foot from a 150 watt ultraviolet lamp, a brilliance of 1,000 microlamberts or more prevails throughout the trajectory and consequently the number of seconds' duration of 100 microlambert brilliance would be greatly extended and accordingly the phosphorescence factor increased.

With reasonably uniform periods of exposure to the activating source, such as would normally be observed in rapid fire target practice, there is no noticeable lack of uniformity of visibility between successive targets, but it will be understood that the longer a target is exposed to the activating source, the greater, within limits, will be its brilliance, provided it is immediately projected.

Referring now to Figure 1 of the drawings, the ordinary clay pigeon 1 is provided, in accordance with the usual practice, with a dome surface 2, so that when projected in space, the dome surface 2 is in general addressed to the shooter. In accordance with this embodiment of the present invention, the entire dome surface, from the outer periphery to the center thereof, is coated with a luminescent pigment. Such luminescent pigment may be applied in any suitable carrier, such, for example, as glue. For example, a water solution of 40% animal glue may have incorporated therein 40% zinc sulphide. The resultant paint is thereupon applied to the dome surface 2 of the target, so that .06 gram of zinc sulphide per square inch is deposited thereon. Such a target may be activated while in position on the throwing arm of a trap. As shown diagrammatically in Figure 3, the target 1 is in position upon the throwing arm 3 of any suitable trap mechanism 4 and arranged thereadjacent is a source 5 of activating energy, which, as hereinbefore indicated, may be an incandescent lamp of high candle power, such as a 150 watt bulb or a source of ultraviolet light or other source of short wave length radiant energy. After one target is projected into space by the trap 4, the next successive target is placed upon the throwing arm 3 in the field of the source of energy 5, so as to be activated thereon, and remains exposed to the energy source 5 until the trap is next operated to project the thus exposed target into space. This operation is repeated from target to target, a period of four seconds' exposure being ample to accomplish the desired phosphorescence.

In Figure 2 of the drawings, the luminescent coating is applied to restricted areas of the target. In the example shown, the outer cylindrical rim 6 of the target is coated with the luminescent pigment and, in addition thereto, one or more interior rings, such as 7, may be similarly coated.

It will be understood that, so long as sufficient of the area of the target which is addressed to the shooter while traveling in space is coated with the luminescent pigment, so that a substantial area is visible, it will be possible for the shooter to follow the target in its travel through space. As pointed out hereinbefore, however, the phosphorescence of the coated area must be of brilliance of at least 100 microlamberts during its travel.

For "skeet" shooting, where the successive targets are thrown from a plurality to trap stations, it sometimes happens that, at some shooting stations, the "under" side of a target in flight may address the shooter. In such cases it is obviously desirable to render both the "top" and "under" sides of the target phosphorescent, and consequently both sides may be coated with the luminescent pigment as above described. In order to concurrently activate both sides of the target, the throwing arm of the trap may be made open or of material transparent to the activating light, and a second source of activating light so arranged that the under side of the target will be within the activating field when the target rests upon the trap arm prior to throwing.

From the foregoing description, it will be readily understood that the present invention accomplishes its objects and that the invention is not limited to clay targets of any particular type nor to specific luminescent pigment or combinations thereof. Consequently, the invention admits of many variations from the details of the foregoing disclosure consistent with the principle that the phosphorescent factor of the coating be within the limits aforesaid.

Having thus described the invention, what is claimed and desired to be secured by Letters Patent is:

1. A clay target having an area thereof coated with luminescent pigment having a phosphorescence factor of at least 0.25.

2. A clay target having an area thereof coated with luminescent pigment having a phosphorescence factor of at least 0.25, said coated area defining the perimeter of the target.

3. A clay target having an area thereof coated with luminescent pigment having a phosphorescence factor of at least 0.25, said coated area embracing substantially the entire dome of the target.

4. A target consisting of a brittle dish-shaped article having a definitive area thereof coated with luminescent pigment, said target being free of inflammable parts.

5. That improvement in the art of nocturnal trap shooting which comprises, providing a quantity of clay targets each having a definitive area coated with luminescent pigment having a phosphorescence factor of at least 0.25, successively exposing the coated areas of the targets individually to an activating source, and projecting the activated targets immediately from the field of the activating source into dark space, said exposure to the activating source being for a time sufficient that the coated area of such target retains a brilliance of at least 100 microlamberts for at least one second after departure from the field of the activating source.

6. The improvement of claim 5 wherein the activating source is continuously energized and the respective targets are successively moved into and out of the field of the activating source without interrupting the latter.

7. That improvement in the art of nocturnal trap shooting which comprises, providing a clay target having a definitive area coated with luminescent pigment having a phosphoresence factor of at least 0.25, exposing the complete coated area of the target directly to an activating source, and immediately projecting the target freely through dark space; said exposure to the activating source being for a time sufficient that the definitive area of the target retains a brilliance of at least 100 microlamberts for at least one second after leaving the field of the activating source.

8. An article of manufacture for use as a trap shooting target to be cast freely through dark space, consisting of a clay target having a definitive area coated with luminescent pigment which retains a brilliance of at least 100 microlamberts for at least one second after activation equivalent to a period of four seconds under a 150 watt incandescent lamp at a distance of one foot.

ARVEL O. FRANZ.
LEWIS EDMUND WALKUP.

REFERENCES CITED

The following references are of record in the file of this patent:

UNITED STATES PATENTS

| Number | Name | Date |
|---|---|---|
| 393,435 | Jacobs | Nov. 27, 1888 |
| 1,543,931 | Law | June 30, 1925 |
| 2,308,423 | Millson | Jan. 12, 1943 |

Certificate of Correction

Patent No. 2,568,279

September 18, 1951

ARVEL O. FRANZ ET AL.

It is hereby certified that error appears in the printed specification of the above numbered patent requiring correction as follows:

Column 4, line 47, for "to trap" read *of trap*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*